(12) United States Patent
Hale

(10) Patent No.: US 12,451,534 B2
(45) Date of Patent: Oct. 21, 2025

(54) INTERCONNECTION

(71) Applicant: GELION TECHNOLOGIES PTY LTD, Eveleigh (AU)

(72) Inventor: Christopher Hale, Abingdon (GB)

(73) Assignee: Gelion Technologies Pty Ltd, Eveleigh (AU)

( * ) Notice: Subject to any disclaimer, the term of this patent is extended or adjusted under 35 U.S.C. 154(b) by 19 days.

(21) Appl. No.: 16/345,661

(22) PCT Filed: Oct. 24, 2017

(86) PCT No.: PCT/GB2017/053207
§ 371 (c)(1),
(2) Date: Apr. 26, 2019

(87) PCT Pub. No.: WO2018/078353
PCT Pub. Date: May 3, 2018

(65) Prior Publication Data
US 2019/0305281 A1   Oct. 3, 2019

(30) Foreign Application Priority Data

Oct. 25, 2016 (GB) ..................... 1618022

(51) Int. Cl.
*H01M 10/613* (2014.01)
*H01M 10/052* (2010.01)
(Continued)

(52) U.S. Cl.
CPC ....... *H01M 10/613* (2015.04); *H01M 10/052* (2013.01); *H01M 10/637* (2015.04);
(Continued)

(58) Field of Classification Search
None
See application file for complete search history.

(56) References Cited

U.S. PATENT DOCUMENTS

| 8,994,339 B1* | 3/2015 | Kam | H01M 10/486 320/150 |
| 2010/0203378 A1* | 8/2010 | Narbonne | H01M 10/425 429/160 |

(Continued)

FOREIGN PATENT DOCUMENTS

| CN | 102356504 A | 2/2012 |
| CN | 103545572 A | 1/2014 |

(Continued)

OTHER PUBLICATIONS

International Search Report for PCT/GB2017/053207 dated May 3, 2018, 3 pages.

(Continued)

*Primary Examiner* — Allison Bourke
*Assistant Examiner* — Heng M. Chan
(74) *Attorney, Agent, or Firm* — BakerHostetler

(57) ABSTRACT

An interconnection for a battery comprising a plurality of cells, the interconnection comprising: an electrically insulating substrate having a first face and a second face; a heat sink on the first face of the substrate; and a layer of electrically conducting material on the second face of the substrate, said layer of electrically conducting material providing one or more cell-receiving regions for connection with the plurality of cells.

12 Claims, 3 Drawing Sheets

(51) Int. Cl.

| | | |
|---|---|---|
| *H01M 10/39* | (2006.01) | |
| *H01M 10/48* | (2006.01) | |
| *H01M 10/637* | (2014.01) | |
| *H01M 10/647* | (2014.01) | |
| *H01M 10/653* | (2014.01) | |
| *H01M 10/6551* | (2014.01) | |
| *H01M 10/6554* | (2014.01) | |
| *H01M 10/657* | (2014.01) | |
| *H01M 10/667* | (2014.01) | |
| *H01M 50/211* | (2021.01) | |
| *H01M 50/253* | (2021.01) | |
| *H01M 50/503* | (2021.01) | |
| *H01M 50/519* | (2021.01) | |
| *H01M 50/522* | (2021.01) | |

(52) U.S. Cl.
CPC ....... *H01M 10/647* (2015.04); *H01M 10/653* (2015.04); *H01M 10/6551* (2015.04); *H01M 10/6554* (2015.04); *H01M 10/657* (2015.04); *H01M 10/667* (2015.04); *H01M 50/211* (2021.01); *H01M 50/253* (2021.01); *H01M 50/503* (2021.01); *H01M 50/519* (2021.01); *H01M 50/522* (2021.01); *H01M 10/3909* (2013.01); *H01M 10/486* (2013.01)

(56) References Cited

U.S. PATENT DOCUMENTS

| | | | |
|---|---|---|---|
| 2011/0070474 A1 | 3/2011 | Lee et al. | |
| 2012/0100407 A1 | 4/2012 | Inoue et al. | |
| 2012/0188714 A1* | 7/2012 | Von Borck | H01M 10/663 361/688 |
| 2013/0108899 A1* | 5/2013 | Schaefer | H01M 10/0569 429/50 |
| 2014/0017537 A1 | 1/2014 | Lu et al. | |
| 2014/0038008 A1 | 2/2014 | Saitou et al. | |
| 2014/0272517 A1 | 9/2014 | Glasgow et al. | |
| 2015/0056506 A1 | 2/2015 | Lilley et al. | |
| 2016/0028128 A1 | 1/2016 | Limvorapun | |
| 2017/0244139 A1* | 8/2017 | Tononishi | H01M 10/482 |
| 2018/0301772 A1* | 10/2018 | Morita | H01G 2/04 |

FOREIGN PATENT DOCUMENTS

| | | | | |
|---|---|---|---|---|
| CN | 103999261 A | | 8/2014 | |
| CN | 104995758 A | | 10/2015 | |
| DE | 102008010838 A1 | | 8/2009 | |
| EP | 2685543 A1 | | 1/2014 | |
| JP | 2002-42903 A | | 2/2002 | |
| JP | 2012079553 A | | 4/2012 | |
| JP | 2012119147 A | * | 6/2012 | |
| JP | 2013175423 A | | 9/2013 | |
| JP | 2015527708 A | | 9/2015 | |
| JP | 2016029643 A | | 3/2016 | |
| WO | WO 2009/103462 A1 | | 8/2009 | |
| WO | WO 2012/105160 A1 | | 9/2012 | |
| WO | WO 2013/088115 A1 | | 6/2013 | |
| WO | WO 2014/016393 A1 | | 1/2014 | |
| WO | WO 2014/130260 A1 | | 8/2014 | |
| WO | WO 2015/061443 A1 | | 4/2015 | |
| WO | WO-2017073258 A1 | * | 5/2017 | ........ H01M 10/6551 |

OTHER PUBLICATIONS

Written Opinion of the International Searching Authority for PCT/GB2017/053207 dated May 3, 2018, 6 pages.
Chinese Office Action for patent application No. CN 201780066096.3 dated Aug. 3, 2021, 12 pages.
Great Britain Search Report for patent application No. GB1618022.6 dated May 24, 2017, 6 pages.
Japanese Office Action for patent application No. JP 2019-522230 dated Jun. 11, 2021, 5 pages.

* cited by examiner

INTERCONNECTION

CROSS-REFERENCE TO RELATED APPLICATIONS

This application is a National Stage filing under 35 U.S.C. § 371 of International Patent Application No. PCT/GB2017/053207, filed Oct. 24, 2017 and entitled "INTERCONNECTION", which claims the benefit of priority to GB Application No. 1618022.6, filed Oct. 25, 2016, both applications of which are herein incorporated by reference in their entirety for all purposes.

FIELD OF THE INVENTION

This invention relates to an interconnection for a battery comprising a plurality of cells. This invention also relates to a battery comprising such an interconnection, as well as a method for controlling the temperature of a battery.

BACKGROUND

A typical electrochemical cell comprises an anode, a cathode and an electrolyte disposed between the anode and cathode. The anode, cathode and electrolyte may be contained within a housing, for example, a pouch. Electrical connections, for example, connection tabs may be coupled to the housing to provide electrical connection with the anode and cathode of the cell.

A typical battery comprises a plurality of electrochemical cells. The cells may be coupled in series or in parallel, for example, by coupling the electrical connections to an electrical connector.

As the battery charges or discharges, the temperature of the electrochemical cells may rise. In some instances, it may be desirable to ensure that the battery is operating at an optimum temperature. The temperature of the battery may be reduced, for example, by allowing air to circulate around the cells and/or the electrical connections that are coupled to the cell housing.

BRIEF DESCRIPTION OF FIGURES

One or more embodiments of the invention are shown schematically, by way of example only, in the accompanying drawings, in which.

DESCRIPTION

Figure 1:
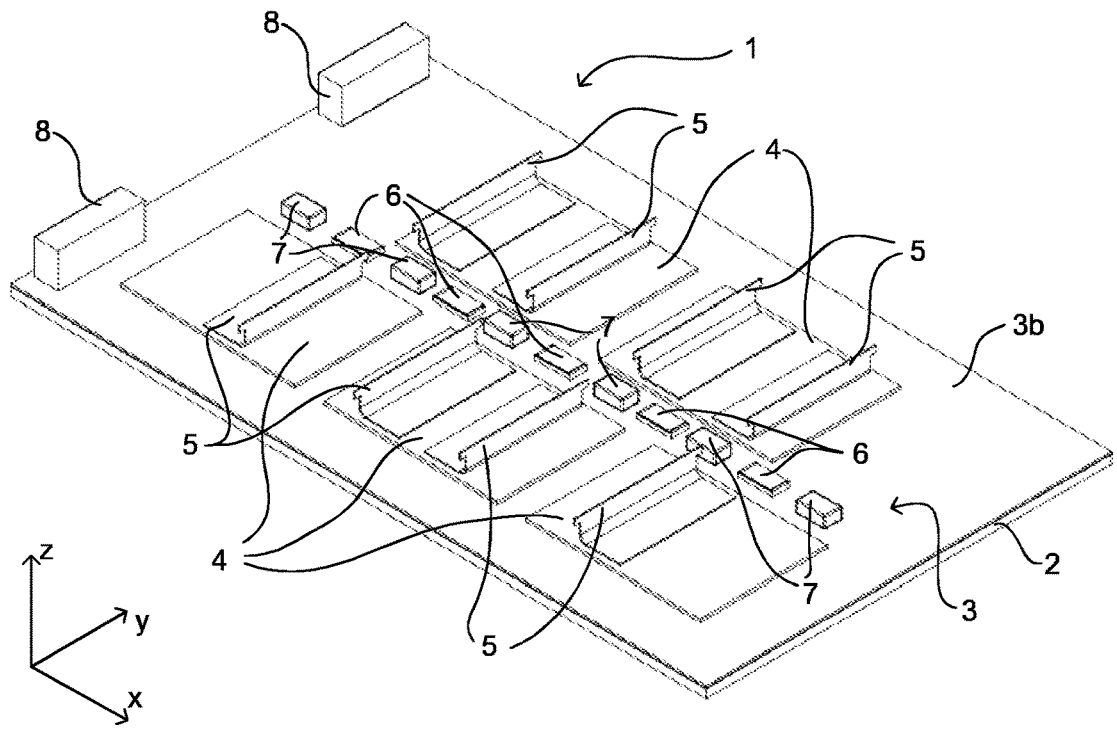
FIG. 1 is an isometric projection of an interconnection according to an embodiment of the invention.

Before particular examples of the present invention are described, it is to be understood that the present disclosure is not limited to the particular interconnection, battery or method disclosed herein. It is also to be understood that the terminology used herein is used for describing particular examples only and is not intended to be limiting, as the scope In describing and claiming the interconnection, battery and method of the present invention, the following terminology will be used: the singular forms "a", "an", and "the" include plural forms unless the context clearly dictates otherwise. Thus, for example, reference to "an anode" includes reference to one or more of such elements.

According to the present disclosure, there is provided an interconnection for a battery comprising a plurality of cells, the interconnection comprising an electrically insulating substrate having a first face and a second face; a heat sink on the first face of the substrate; and a layer of electrically conducting material on the second face of the substrate, said layer of electrically conducting material providing one or more cell-receiving regions for connection to the plurality of cells.

The present disclosure also relates to a battery comprising an interconnection as described herein; and a plurality of cells electrically connected to the one or more cell-receiving regions of the interconnection.

The present disclosure further relates to a method of controlling the temperature of the battery as described herein. The method comprises conducting any heat generated in the cells to the cell-receiving regions on the second face of the substrate, and through the substrate to the heat sink, thereby dissipating heat from battery.

As mentioned above, the interconnection of the present disclosure comprises an electrically insulating substrate having a first face and a second face. The first face is provided with a heat sink, for example, in the form of a metal plate disposed on the first face of the substrate. A layer of electrically conducting material is disposed on the second face of the substrate to provide one or more cell-receiving regions for connection with the plurality of cells. When the cells are connected to the electrical interfaces, heat energy generated in the cells can be conducted away from the cells to the cell-receiving regions on the second face of the electrically insulating substrate. By providing a heat sink on the second face of the electrically insulating substrate, heat can be transferred from the cell-receiving regions to the heat sink in an effective manner, allowing heat to be dissipated from the interconnection. Advantageously, the electrically insulating substrate is thermally conductive, allowing heat to be conducted from one face of the substrate to the other in an effective manner. The thickness of the electrically insulating substrate may also be selected to provide a desirable rate of heat transfer between one face of the substrate to the other.

Electrically Insulating Substrate

The electrically insulating substrate may have a thermal conductivity of at least 0.1 $W.m^{-1}.K^{-1}$. The thermal conductivity may be at least 0.2 $W.m^{-1}.K^{-1}$, preferably at least 0.5 $W.m^{-1}.K^{-1}$. The thermal conductivity may be at most 6.5 $W.m^{-1}.K^{-1}$, preferably at most 10 $W.m^{-1}.K^{-1}$. In some examples, the thermal conductivity may be 0.6 to 4.8 $W.m^{-1}.K^{-1}$, preferably 1 to 3 $W.m^{-1}.K^{-1}$, more preferably 1.5 to 4 $W.m^{-1}.K^{-1}$. In a preferred example, the thermal conductivity is 2 $W.m^{-1}.K^{-1}$.

The electrically insulating substrate may be formed of any suitable material. Examples include glass reinforced epoxy materials, for instance, FR-4.

The electrically insulating substrate may have a thickness of less than 3 mm, preferably less than 2 mm, more preferably less than 1 mm. In one example, the electrically insulating substrate may have a thickness of 10 microns to 2 mm, preferably 30 microns to 1 mm, more preferably 50 microns to 0.5 or 1 mm. In a preferred example, the substrate has a thickness of 70 to 300 microns, for example, 100 to 200 microns.

The electrically insulating substrate may be substantially planar.

A heat sink is disposed on the first face of the electrically insulating substrate. The heat sink can act as a passive heat exchanger that allows heat to be dissipated away from the battery. For example, when one or more cells are coupled to the cell-receiving regions on the second face of the substrate, heat generated in the cells may be conducted to the cell-receiving regions and through the body of the substrate to the heat sink. Advantageously, the heat sink is made of a material that is highly thermally conductive, allowing the heat to be dissipated to the surroundings by conduction e.g. to the surrounding air. The heat sink may be in direct contact with the first face of the electrically insulating substrate.

The heat sink may be formed of a material having a thermal conductivity of at least 20 $W.m^{-1}.K^{-1}$, preferably at least 50 $W.m^{-1}.K^{-1}$. The thermal conductivity may be at most 500 $W.m^{-1}.K^{-1}$, preferably at most 300 $W.m^{-1}.K^{-1}$. In some examples, the thermal conductivity may be 20 to 500 $W.m^{-1}.K^{-1}$, preferably 50 to 400 $W.m^{-1}.K^{-1}$, more preferably 80 to 300 $W.m^{-1}.K^{-1}$. In a preferred example, the thermal conductivity is 100 to 250 $W.m^{-1}.K^{-1}$.

The heat sink may be in direct contact with the first face of the electrically insulating substrate. For example, the heat sink may take the form of a metal layer positioned adjacent to and in contact with the electrically insulating substrate. The metal layer may be formed of any suitable metal. Examples include steel, stainless steel, nickel, copper and aluminium. Preferably, the metal is aluminium. The metal layer may be any suitable thickness. For example, the metal layer may be 0.1 to 10 mm thick, preferably 0.5 to 5 mm thick, for instance, 1 to 3 mm thick. In a preferred example, the metal layer is 1 to 2 mm thick, for instance, 1.5 mm thick. The metal layer may be thicker than each of the electrically insulating substrate and the layer of electrically conducting material. The metal layer may be at least 5 times thicker, for example, at least 10 times thicker than the electrically insulating substrate.

The heat sink may include surface features that aid the flow of air or other fluid (e.g. gaseous) coolant across the heat sink. These surface features may include fins.

A layer of electrically conducting material is deposited on the second face of the substrate. In one example, the second face of the substrate opposes the first face of the substrate. The layer of electrically conducting material provides one or more cell-receiving regions for connection to the plurality of cells. For example, the cell-receiving regions may provide electrical interfaces to which the cells may be coupled. In one example, a plurality of cell-receiving regions are provided, said cell-receiving regions being disposed on the substrate in spaced relation to one another. Accordingly, when cells are connected to the cell-receiving regions, the cells may be positioned adjacent to one another, for example, as a stack. The cells may or may not be in contact with one another in the stack. In some examples, there may be gaps between the cells that allow air to flow between the cells and/or the contact or connection tabs used to connect the cells to the cell-receiving regions.

The cell-receiving regions may take the form of electrically conducting strips on the second face of the substrate. The strips may provide connection for a plurality of cells.

Alternatively, the cell-receiving regions or interfaces may be discrete cell-receiving regions or pads that are connected to one another by conductive tracks of the electrically conductive material. Each of these cell-receiving regions or pads may be sized to allow connection to at least one connection tab of a cell. A cell may be connected to the interconnection via one or more cell-receiving pads. In one example, the anode(s) of a cell are connected to the interconnection via a contact tab coupled to one cell-receiving pad, while the cathode(s) of a cell are connected to the interface via a contact tab coupled to a different cell-receiving pad. The spacing between the cell-receiving pad to which the anode(s) of the cell is attached ("anode pad") and the contact tab to which the cathode(s) of the cell is attached ("cathode pad") may be selected depending on the spacing between the contact tab of the anode(s) and the contact tab of the cathode(s) of the cell. In one example, the spacing between the contact tab of the anode(s) and the contact tab of the cathode(s) may be 5 to 30 mm, for example, about 10 mm. Thus, the spacing between the anode pad and cathode pad may be 5 to 30 mm, for example, about 10 mm.

The layer of electrically conducting material may be formed of a metal. A suitable metal is copper. In one example, a continuous layer of electrically conducting material (e.g. copper) is deposited over the second face of the substrate. Thereafter, sections of the layer are etched away, for example, by acid treatment to leave the desired cell-receiving region(s) and any conductive tracks connecting the region(s).

The layer of electrically conducting material may have a thickness of less than 1 mm. In one example, the layer may have a thickness of 1 microns to 1 mm, preferably 5 microns to 0.5 mm, more preferably 10 to 200 microns. In a preferred example, the substrate has a thickness of 15 to 100 microns, for example, 20 to 50 microns (e.g. 30 to 40 microns). In one example, the layer of electrically conducting material has a thickness that is less than the thickness of the electrically insulating substrate. For example, the layer of electrically conducting material has a thickness that is 50% or less than the thickness of the electrically insulating substrate.

In one example, the interconnection may be a metal clad printed circuit board (PCB). For example, the printed circuit board may comprise an electrically insulating substrate that is provided (e.g. printed) with the layer of electrically conducting material (e.g. copper) on one face. A metal layer (e.g. aluminium) may be disposed (e.g. as "cladding") on the opposing face of the substrate to provide the heat sink.

In some examples, the layer of electrically conductive material is provided (e.g. printed) on the second face of the electrically insulating substrate as discrete cell-receiving regions or pads that are connected to one another by conductive tracks of the electrically conductive material.

The thicknesses of the electrically insulating substrate, layer of electrically conducting material and heat sink may also be selected to optimise the balance between rigidity and weight of the overall construction. Advantageously, the interconnection of the present disclosure is lightweight and rigid. This facilitates the construction of a lightweight battery that may be used in a wide range of applications, for example, a battery for vehicles (e.g. motor vehicles and aircraft).

State of Charge & Temperature Control

In some instances, it may be desirable to control the state of charge of one or more of the plurality of cells. This may require one or more of the cells to be discharged. In some examples, it may be desirable to minimise any differences in the state of charge of the cells in the battery.

To control the state of charge, the interconnection may comprise electrical circuitry to control a state of charge of one or more of the plurality of cells. For example, the electrical circuitry may comprise one or more resistors mounted on the second face of the electrically insulating substrate. The resistors may be connected to the cell-receiving regions by an electrical circuit formed of conductive tracks disposed or imprinted onto the second face of the electrically insulating substrate. When cells are connected to the cell-receiving regions, current may be drawn from the cells through these resistors to reduce the state of charge of the cells.

The electrical circuitry may further comprise one or more switches, which may be opened or closed so as to control the flow of current through the one or more resistors. The one or more switches may be coupled to a controller for controlling the state of the switches, thereby controlling the flow of current from the cells and through the resistors. The circuitry may further comprise one or more voltage gauges arranged to measure a voltage across a cell. The controller may be configured to control the flow of current from the cells in dependence on the measurements made by the voltage gauges. For example, a cell having a voltage which is greater than the lowest voltage cell may be connected to a resistor in order to reduce the state of charge of that cell. The state of charge may be reduced so as to bring it into line with the lowest voltage cell, thereby balancing the state of charge of the cells.

In one example, a resistor or collection of resistors may be provided per cell, allowing each cell to be discharged as required. Any heat energy generated by the resistor(s) during this discharge can be conducted to the heat sink and dissipated in a convenient manner.

In some instances, it may be desirable to control the temperature of one or more of the cells. This may require one or more of the cells to be heated or cooled. In some examples, it may be desirable to minimise any differences in the temperature of the cells in the battery. Accordingly, it may be desirable to minimise temperature gradients across the cells in the battery. For example, one or more cells may be selectively heated to minimise temperature gradients in the battery.

To control the temperature of the cells, the interconnection may be provided with electrical circuitry to control the temperature of one or more of the plurality of cells. For example, the interconnection may comprise heaters operable to raise the temperature of one or more cells in the battery. In one example, the interconnection comprises one or more resistors mounted on the second face of the electrically insulating substrate. A current may be passed through the resistors to generate heat. Preferably, the resistors are positioned at locations proximate or even adjacent to the cell-receiving regions so that heat energy from the resistors can be conducted to the cell-receiving regions and to the cells via, for example, any connectors (e.g. connection tabs) used to connect the cells to the cell-receiving regions of the substrate. In one example, a plurality of resistors is provided, whereby each resistor is located at a location proximate or even adjacent to a cell-receiving region and each cell is provided with a respective resistor or group of resistors.

Where the anode of a cell is coupled to a cell-receiving region and a cathode of the cell is coupled to another (e.g. proximate) cell-receiving region, one or more resistors may be positioned between the cell-receiving regions. These resistors may be used to control the temperature of the cell and/or to alter its state of charge.

The electrical circuitry may further comprise one or more switches, which may be opened or closed so as to control the flow of current through the one or more resistors. The one or more switches may be coupled to a controller for controlling the state of the switches, thereby controlling the flow of current through the resistors.

Any source of electrical energy can be used to supply the current. However, as explained below, the cells themselves may provide the source of current. For example, the resistors may be connected to the cell-receiving regions by an electrical circuit formed of conductive tracks disposed or imprinted onto the second face of the electrically insulating substrate. When cells are connected to the cell-receiving regions, current may be drawn from the cells through these resistors. This flow of current can increase the temperature of the resistors. As explained above, the heat energy produced can be conducted to the cells to increase the temperature of the cells, particularly if the resistors are located at a location proximate to the cell-receiving regions.

In one example, the electrical circuitry used to control the state of charge of the cells are the same as the electrical circuitry used to control the temperature of the cells. For instance, the resistor(s) used to control the state of charge of the cells are the same as the resistor(s) used to control the temperature of the cells.

The electrical circuitry used to control the state of charge of the cells and/or the electrical circuitry used to control the temperature of the cells may be controlled by a battery management system that may be coupled to the battery.

The interconnection may include one or more temperature gauges mounted on the second face of the electrically insulating substrate. The temperature gauges may be positioned along the electrically insulating substrate to provide a temperature reading indicative of the temperature of one or more of the cells. The temperature gauges may be positioned along the electrically insulating substrate to provide an indication of any temperature differences between cells connected at different cell-receiving regions along the substrate. In one example, a plurality of temperature gauges is provided, whereby each gauge is located at a location proximate or even adjacent to a cell-receiving region and each cell is provided with a respective gauge or group of gauges. If temperature differences are detected, electrical circuitry may be activated to heat selected cell(s) to reduce any temperature differences that arise.

Any suitable temperature gauge may be employed. For example, a thermometer, bi-metallic strip or a temperature transducer may be employed. Conductive tracks in the electrically conductive layer to a connector or electrical circuitry can be used to allow temperature to be measured by a control circuit.

One or more electrical connectors for connection of components other than the cells may be mounted on the substrate. For example, components suitable for measuring voltages (e.g. cell voltages), measuring temperature, providing power (e.g. to power one or more heat sources) and/or controlling one or more components such as switches mounted on the substrate may be connected to one or more connectors mounted on the substrate. A suitable connector may, for example, take the form of an electrical board connector such as those commonly used to establish electrical connection to a PCB. Connectors mounted on the substrate may allow electrical connections to be established with circuitry on the substrate (for example, in the form of conductive tracks on the substrate). For example, electrical connections may be established for the purposes of monitoring and/or controlling circuitry on the substrate.

Battery

The battery may be any suitable battery. The battery may comprise a plurality of electrochemical cells. Each electrochemical cell may comprise a cell stack comprising an anode and a cathode, and an electrolyte disposed between the anode and the cathode. The cell stack may be contained within a housing, for example, a cylindrical housing or pouch.

Electrical connections, for example, connection tabs may be coupled to the housing to provide electrical connection with the anode and cathode of the cell. The connection tabs may be welded, soldered or otherwise connected to the electrode or to a current collector of the electrode inside the housing.

The electrical connections may extend from one side or face of the housing. For example, in the case of a pouch cell, the electrical connections or connection tabs may extend from one side of the pouch. In one example, the housing (e.g. pouch) may include an anode connection tab that is connected to the anode(s) in the housing (e.g. pouch) and a cathode connection tab that is connected to the cathode(s) in the pouch. The anode tab may be coupled to one cell-receiving region, while the cathode tab may be coupled to another (e.g. proximate) cell-receiving region.

The electrical connections may be coupled to the cell-receiving regions of the interconnection using any suitable method. For example, the electrical connections may be coupled to the cell-receiving regions of the interconnection using a conductive adhesive or soldering. Alternatively, the electrical connections may be welded (e.g. ultrasonically- or laser-welded) to the electrical interfaces provided by the cell-receiving regions. In one example, the electrical connections may take the form of a contact tab formed of a metal foil. Suitable metal foils include aluminium or nickel foil. These electrical connections may be welded to the cell-receiving regions of the interconnection. The cell-receiving regions may be formed from, for example, of copper. In some examples, the cell-receiving region may take the form of a pad.

In one example of the present disclosure, the electrochemical cells are pouch cells. The pouch cells are provided with electrical connections in the form of contact tabs formed of metal foil.

Any suitable electrochemical cell may be used. In some examples of the disclosure, the electrochemical cells are lithium cells. Suitable lithium cells include lithium-ion, lithium-air, lithium-polymer and lithium-sulphur cells.

In an example of the present disclosure, the electrochemical cells are lithium-sulphur cells. A lithium-sulphur cell may include a lithium anode and a cathode comprising an electroactive sulphur material. The anode may be formed of lithium metal or a lithium metal alloy. Preferably, the anode is a metal foil electrode, such as a lithium foil electrode. The lithium foil may be formed of lithium metal or lithium metal alloy.

The cathode may comprise a matrix comprising an electroactive sulphur material and an electrically conductive material. This matrix may form an electroactive layer, which is placed in contact with a current collector. The current may be formed, for example, of aluminium foil.

The electroactive sulphur material may comprise elemental sulphur, sulphur-based organic compounds, sulphur-based inorganic compounds and sulphur-containing polymers. Preferably, elemental sulphur is used.

The electrically conductive material may be any suitable solid electrically conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The electroactive sulphur material may be present in the matrix deposited on the current collector in an amount of 60 to 90 weight %, preferably 65 to 85 weight %, more preferably 70 to 80 weight %.

The electrically conductive material may be present in the matrix deposited on the current collector in an amount of 10 to 45 weight %, preferably 15 to 35 weight %, more preferably 20 to 25 weight %.

The weight ratio of electroactive sulphur material to electrically conductive material may be 0.01-10:10-50, preferably 0.1-5:15-45, more preferably 1-5:20-35.

Any suitable electrolyte may be used. The electrolyte may comprise an organic solvent and a lithium salt. Suitable organic solvents include ethers, esters, amide, amine, sulfoxides, sulfamides, organophosphates and sulfones. Examples include tetrahydrofuran, 2-methyltetrahydrofuran, methylpropylpropionate, ethylpropylpropionate, methyl acetate, 1,2-dimethoxyethane, 1,3-dioxolane, diglyme (2-methoxyethyl ether), triglyme, tetraglyme, butyrolactone, 1,4-dioxane, 1,3-dioxane, hexamethyl phosphoamide, pyridine, dimethyl sulfoxide, tributyl phosphate, trimethyl phosphate, N, N, N, N-tetraethyl sulfamide, and sulfones and their mixtures.

Suitable electrolyte salts include lithium salts. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Preferably the lithium salt is lithium trifluoromethanesulphonate (also known as lithium triflate). Combinations of salts may be employed. For example, lithium triflate may be used in combination with lithium nitrate. The lithium salt may be present in the electrolyte at a concentration of 0.1 to 5M, preferably, 0.5 to 3M.

A separator may be placed between the anode and cathode. Where a separator is present, the separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Aspects of the present invention will now be described with reference to the drawings.

Figure 2A:
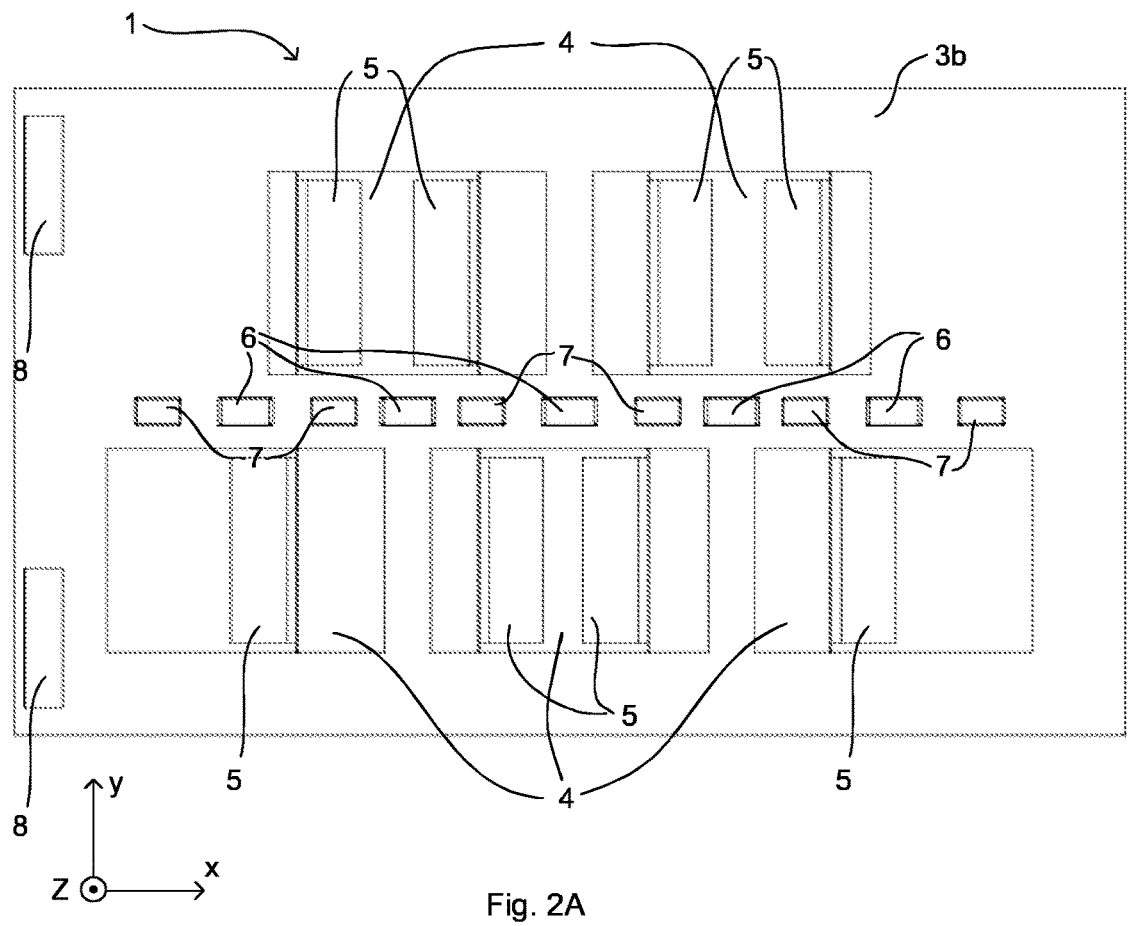
FIG. 2A is a top down view of the interconnection of FIG. 1.
Figure 2B:
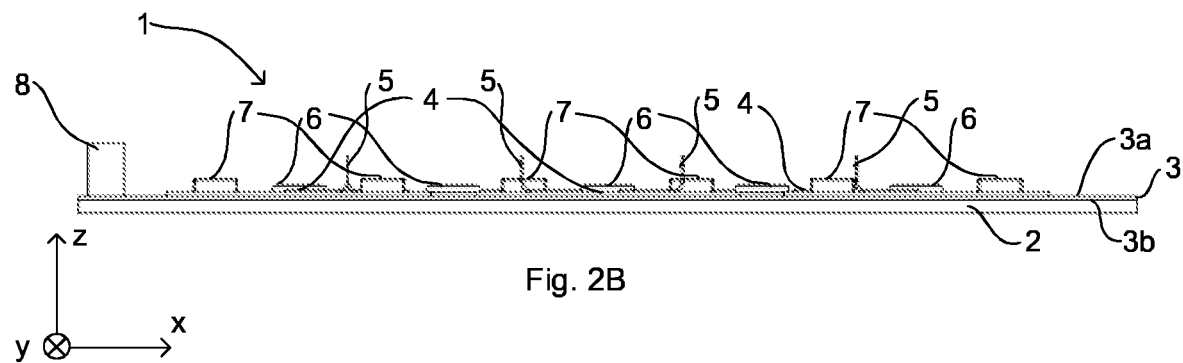
FIG. 2B is a side on view of the interconnection of FIG. 1.
Figure 2C:
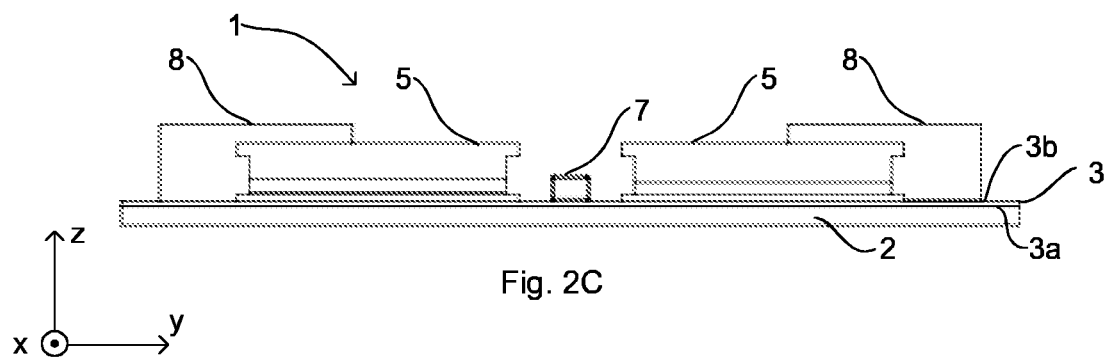
FIG. 2C is an end on view of the interconnection of FIG. 1.
Figure 3A:
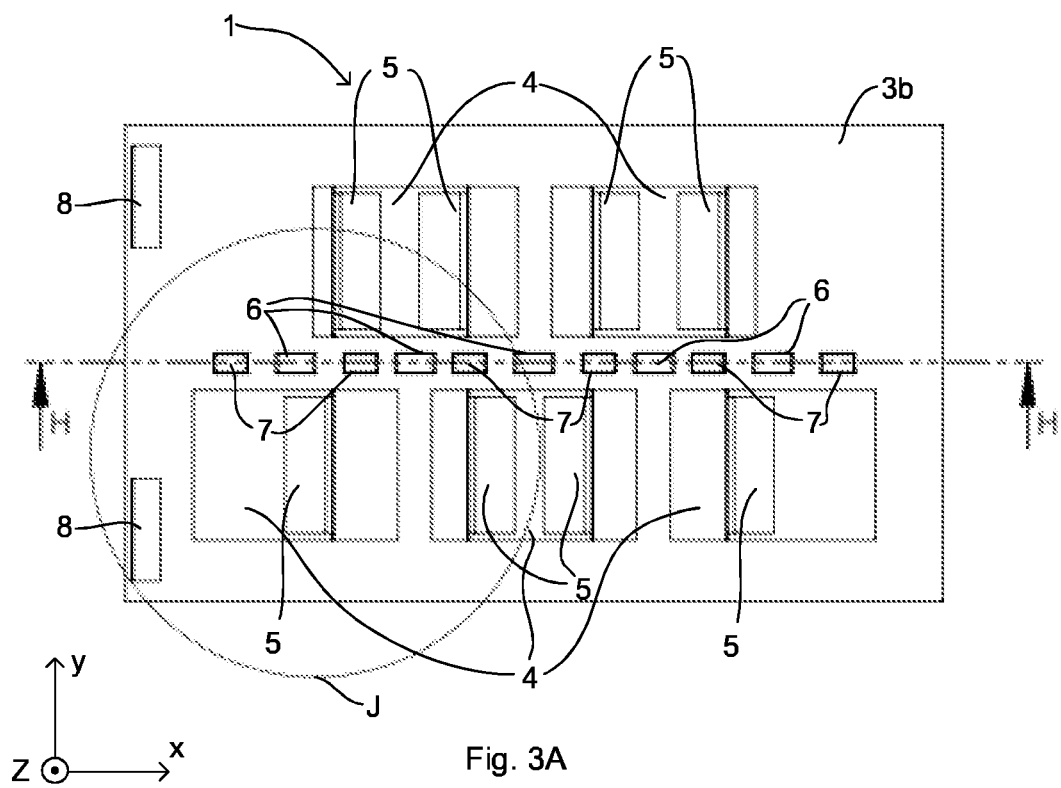
FIG. 3A is a top down view of the interconnection of FIG. 1.
Figure 3B:
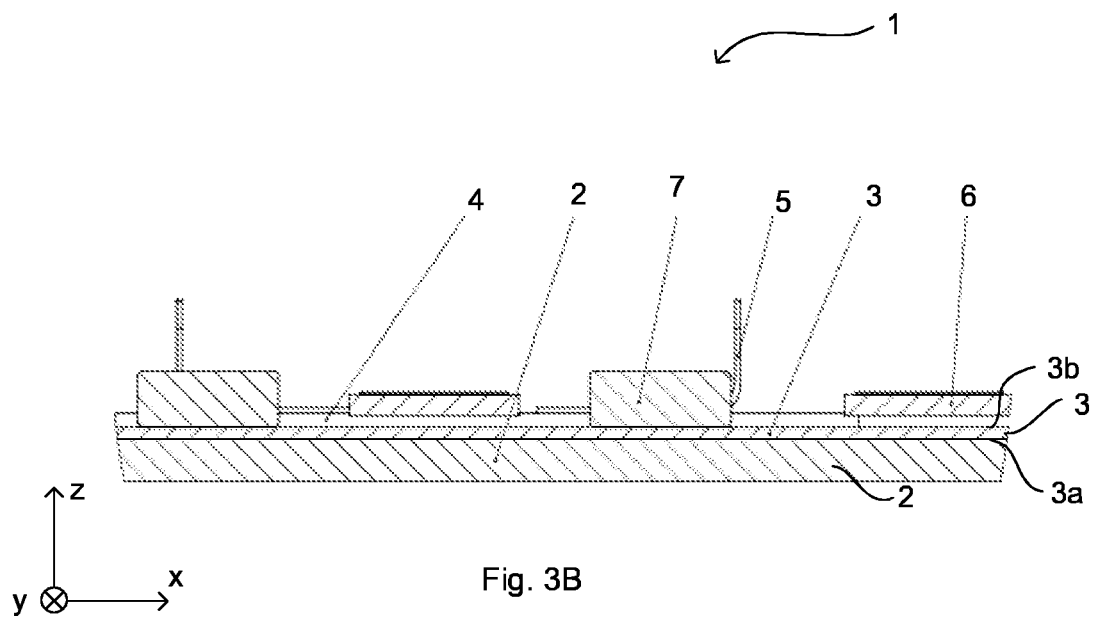
FIG. 3B is a cross-section of the interconnection taken through H-H as shown in FIG. 3A.
Figure 3C:
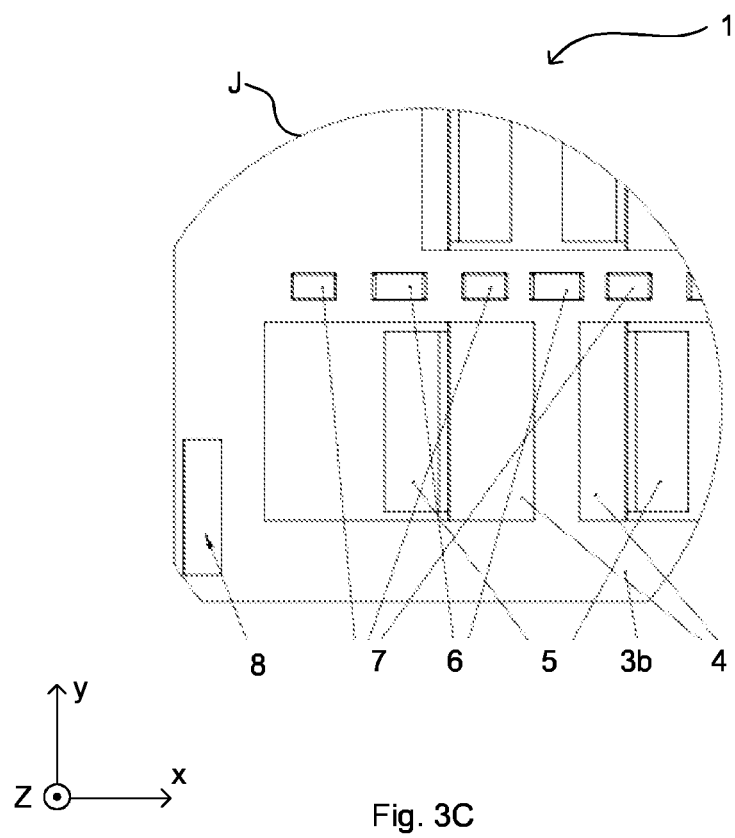
FIG. 3C is a top down view of a section J of the interconnection of FIG. 3A.

FIGS. 1-3 schematically illustrate, by way of a plurality of different perspectives, an interconnection 1 for a battery according to an embodiment of the invention. Also shown in the Figures is a Cartesian coordinate system, which is used consistently throughout. FIGS. 3B and 3C illustrate sections of the interconnection 1 in more detail. The illustration shown in FIG. 3A includes demarcation of a section J of the interconnection 1. The section J of the interconnection 1 is shown in detail in FIG. 3C. Also shown in FIG. 3A is a line H-H. FIG. 3B shows a cross-section of the interconnection 1 taken through the line H-H.

The interconnection 1 is suitable for use in a battery comprising a plurality of electrochemical cells (not shown). The interconnection 1 may provide electrical connection between the plurality of cells and may provide electrical connection between the cells and terminals of the battery. The battery may be charged and/or discharged through the terminals and via the interconnection. For example, a load may be connected to the terminals and the battery may discharge to the load. Additionally or alternatively a power source may be connected to the terminals and the battery may be charged from the power source.

The interconnection 1 may provide electrical connection between a plurality of cells so as to connect at least some of the cells in series with each other. Additionally or alternatively, the interconnection 1 may provide electrical connection between a plurality of cells so as to connect at least some of the cells in parallel with each other.

The interconnection 1 comprises an electrically insulating substrate 3, a heat sink 2 and a layer of electrically conducting material 4. The substrate 3 has a first face 3a and a second face 3b. The heat sink 2 is situated on the first face 3a and the layer of electrically conducting material 4 is situated on the second face 3b. In the embodiment which is shown in the drawings, the second face 3b opposes the first face 3a. Whilst the interconnection which is shown in the Figures includes a flat substrate 3 in which the first face 3a is substantially parallel with the second face 3b, other configurations may be contemplated in which the first and second faces are not parallel.

The layer of electrically conducting material 4 is arranged to provide a plurality of cell-receiving regions 4 for electrical connection with the plurality of cells. Through this description, the cell-receiving regions 4 may be referred to as interfaces for connection to one or more cells. A plurality of connection tabs 5 are shown in the Figures as being electrically connected to the interfaces 4. For the purposes of this description, the tabs 5 are considered to form part of the cells (not shown) and are not considered to form part of the interconnection 1. The tabs 5 may, for example, form negative and positive terminals of the cells. The tabs 5 may be connected to the interfaces 4 by any suitable means. For example, the tabs 5 may be connected by welding, such as ultrasonic welding or laser welding, may be connected by conductive adhesive and/or by soldering the tabs 5 to the interfaces 4.

Whilst electrical connections between the interfaces 4 and the cells are shown in the Figures by way of connection tabs 5, in other embodiments other forms of connection may be used. For example, one or more conductive wires, bars or rods may be connected to the interfaces 4. Connection tabs 5 may, in particular, be used in embodiments in which the electrochemical cells are housed in pouches. However, any compatible combination of cells and connections may be used.

In the embodiment shown in the Figures, the cell-receiving regions 4 (otherwise referred to as interfaces) are formed from substantially flat pads of conductive material. However, in other embodiments, the interfaces 4 may comprise any suitably shaped region of conductive material with which electrical connection to a cell may be established. The interfaces 4 may be arranged on the substrate 3 to facilitate connection of cells to the interfaces 4. For example, a separation between adjacent interfaces 4 may approximately correspond to a separation between connection tabs 5 on a cell. One or more dimensions of the interfaces may be arranged to approximately match a dimension of a connection to a cell. For example, in the depicted embodiment, the extent of the interfaces 4 in the y-direction approximately corresponds with the extent to the connection tabs 5 in the y-direction so as to facilitate connection of the tabs 5 to the interfaces 4.

Whilst not explicitly shown in the Figures, the interconnection 1 may further comprise electrical connections between at least some of the interfaces 4 and/or other components. For example, the layer of electrically conductive material may further comprise conductive tracks (not shown) electrically coupled to one or more of the interfaces 4. Conductive tracks may form electrical connection between the one or more of the interfaces 4 and/or one or more other components.

The layer of electrically conductive material may be formed of a metal, such as copper. During manufacture, a continuous layer of electrically conductive material may be deposited on the second face 3b of the substrate (using any suitable technique). For example, a continuous layer of conductive material may be deposited on the entirety of the second face 3b or on a discrete region of the second face 3b. One or more sections of the conductive material may subsequently be etched away to leave the interfaces 4 and any desired conductive tracks extending between the interfaces 4 and/or other electrical components. Methods of manufacture of electrical circuitry and/or interfaces 4 on the substrate 3 may be similar or identical to those commonly used to manufacture a printed circuit board (PCB). In some embodiments, at least some of the interconnection may be considered to be an example of a PCB (e.g. a metal clad PCB).

Whilst not shown in the Figures, the interconnection 1 may be provided with one or more connectors to which terminals of the battery are electrically connected. The connectors may be electrically coupled to the interfaces 4 via conductive tracks on the second face 3b of the substrate. The battery may therefore be charged and/or discharged through the interconnection 1 and the terminals.

During operation of a battery (e.g. charging and/or discharging of the battery) electrical current flows through the connection tabs 5, the interfaces 4 and any other electrical circuitry (e.g. conductive tracks situated on the interconnection). Consequently one or more regions of the interconnection 1, the connection tabs 5 and/or the cells may become heated, for example, due to Joule heating. In addition to direct Joule heating of the interconnection 1 due to current flowing through the interconnection 1, heat may be conducted to the interconnection 1 from the cells, for example, through the connection tabs 5. For example, heat energy may be generated in the cells themselves and may lead to heating of the interconnection, for example, through conduction of heat through the connection tabs 5 and to the interfaces 4.

It may be desirable to provide thermal management of the interconnection 1, the cells and/or other components of the battery. Advantageously, the interconnection 1 is provided with a heat sink 2 on the first face 3a of the substrate 2 to which heat may be conducted. The heat sink 2 may, for example, comprise a layer of thermally conductive material such as a metal. In some embodiments, the heat sink 2 may be formed from aluminium, although other materials may be used. The heat sink 2 functions as a passive heat exchanger which allows heat to be dissipated away from the battery. For example, the heat sink 2 may absorb heat generated elsewhere in the battery (e.g. in the cells and/or the interconnection 1) and dissipate heat to its surroundings.

The heat sink 2 may be in contact with a fluid medium such as air to which heat is dissipated. In some embodiments, a flow of fluid over the heat sink may be generated in order to aid dissipation of heat away from the heat sink. For example, a flow of air may be generated over the heat sink. Additionally or alternatively a liquid coolant may be placed in proximity to the heat sink 2 (for example, in one or more conduits) to allow transfer of heat from the heat sink 2 to the coolant. The heat sink 2 may be provided with a relatively large surface area in order to increase the surface area in contact with a fluid (such as air and/or a liquid coolant), thereby increasing the surface area at which heat may be exchanged. Whilst not shown in the Figures, in some embodiments the heat sink 2 may be provided with one or more features, such as fins, which serve to increase the surface area of the heat sink 2 and/or to aid the flow of fluid over the heat sink 2.

The interconnection 1 is constructed to aid transfer of heat from the interfaces 4 and/or other components situated on the second face 3b of the substrate 3 to the heat sink 2. The substrate 3 is formed from a thermally conductive material, which allows heat to be conducted from the second face 3b to the first face 3a of the substrate 3. For example, the substrate 3 may have a thermal conductivity of at least about $0.2 \text{ W.m}^{-1}.\text{K}^{-1}$ to facilitate conduction of heat to the heat sink 2. A suitable choice of material for the substrate 3 may, for example, include glass reinforced epoxy materials, such as FR-4.

The substrate 3 may be relatively thin and may, for example, have a thickness of less than about 3 mm and in many embodiments may be significantly less than 3 mm. Providing a relatively thin substrate 3 advantageously facilitates conduction of heat between the first and second faces of the substrate 3 and additionally allows the interconnection 1 to have a compact and lightweight construction.

As is shown in the Figures, the heat sink 2 may extend over substantially the entire first face 3a of the substrate 3. Advantageously, this provides a relatively large surface area from which heat may be dissipated from the heat sink 2 and facilitates conduction of heat from different locations on the second face 3b to the heat sink 2.

In some operating conditions, the heat sink 2 may additionally act to prevent large temperature gradients from establishing in the battery and across the interconnection 1. For example, during operation one or more of the plurality of cells of the battery may become hotter than others of the cells. This may be due to differences in the operation conditions of the cells (for example, a difference in the amount of current flowing to/from different cells) or may result from differences in the surrounding conditions of the cells. For example, a battery may comprise a group of cells situated adjacent to each other. Such a group of cells may include cells situated near to an edge of the group and other cells situated in the middle of the group of cells. Those cells situated near to an edge of the group of cells may dissipate some of the heat generated in the cells to their surroundings and may therefore be cooler than other cells in the group. Those cells situated in the middle of the group of cells may be surrounded by other cells, and may not therefore be able to efficiently dissipate heat to their surroundings. Consequently, those cells situated near to the middle of the group may become hotter than those cells situated near to the edge of the group. Consequently, interfaces 4 to which hotter cells are connected may become hotter than interfaces 4 to which cooler cells are connected and a temperature gradient may be established across the interconnection 1.

During operation it is often desirable for the each of a plurality of cells in a battery to be held at approximately the same temperature and for large temperature differences between different cells to be avoided. The heat sink 2 may be formed of a material which is highly thermally conductive. Consequently heat may be conducted from one region of the interconnection 1 to another through the heat sink 2, thereby reducing any temperature gradients which may establish across the interconnection 1. For example, in the event that one or more interfaces 4 become heated to a higher temperature than other interfaces 4, heat may be efficiently conducted from a relatively hot interface 4 to a relative cool interface 4 through the substrate 3 and the heat sink 2. The heat sink 2 may therefore act to reduce any temperature gradients across the interface 1 and may reduce differences in temperature between different cells in a battery.

In some embodiments, active thermal management may be provided in the battery. That is, the interconnection 1 may include electrical circuitry to control the temperature of one or more of the plurality of cells. In the depicted embodiment, electrical circuitry for controlling the temperature of the plurality of cells is provided in the form of resistors 6 mounted on the second face 3b of the substrate 3. Each of the resistors 6 is positioned at a location proximate to one or more of the interfaces 4. Heat generated in a resistor 6 may therefore lead to heating of one or more proximate interfaces 4 (e.g. due to conduction of heat through the substrate and/or the heat sink 2 from the resistor 6 to the interface 4). A cell connected to a heated interface 4 may receive heat by conduction through the interface 4 and a connection tab 5 connected to the interface 4. The resistors 6 may therefore be used to provide localised heating on the interface 1 in order to heat one or more cells connected to the interface 1.

As shown in the Figures the resistors 6 are provided at different locations on the substrate 3 such that different resistors 6 provide heating to different regions of the interconnection 1. Different resistors 6 may therefore provide heating to different interfaces 4 and thus different cells connected to the interfaces 4. In this way the resistors provide controllable and localised heating to the interconnection 1. In the depicted embodiment, the resistors 6 are arranged linearly at different positions on the x-axis shown in the Figures. However, other suitable arrangements of the resistors 6 may be envisaged.

Heating of one or more cells located in proximity to a resistor 6 may be controlled by controlling the electrical current flowing through the resistor 6. For example, in the event that heating of a cell is desired, a potential difference may be connected across a resistor 6 located in proximity to the cell, in order to generate current through the resistor 6, thereby causing the resistor 6 to be heated. In some embodiments, the resistors 6 may be connected between interfaces 4, for example, by electrical circuitry in the form of conductive tracks on the second face 3b of the substrate 3. Connection of a resistor 6 between interfaces 4 allows current to be drawn from one or more cells, connected to the interfaces 4, and through the resistor 6. The one or more connected cells therefore function as a power source for the resistor 6. Whilst the connected cells provide a convenient power source, which may be used to drive a current through a resistor 6 and provide localised heating to the interconnection 1, any electrical power source may be used to drive a current through a resistor 6. For example, one or more of the resistors 6 may be connected across a separate power source (not shown), which is provided for the purposes of providing localised heating to the interconnection 1.

The resistors 6 may be connected in series with one or more switches (not shown) which may be opened and closed in order to control the flow of current through the resistors 6 and thereby control the heating which is provided to the interconnection 1. The flow of current may be controlled by any suitable control circuitry. For example, the interconnection 1 may comprise a controller (e.g. in the form of a micro-processor) arranged to control the flow of current through one or more of the resistors 6. The controller (not shown) may be mounted on the substrate 1 or may be situated separately from the substrate 3. The controller may be connected to circuitry situated on the substrate (e.g. in the form of one or more resistors 6 and/or one or more switches) via a connection 8 provided on the substrate 8. The connection 8 may comprise any suitable interface (e.g. a socket) for connection of one or more external components, such as a controller. The connection 8 may be connected to circuitry on the substrate via one or more conductive tracks (not shown), which extend across the second face 3b of the substrate 3. In the depicted embodiment, two connections 8 are shown, however any number of connections 8 may be provided. Different connections 8 may be provided for connection of different components or may provide multiple connections to the same components.

In some embodiments, heating of the interconnection 1 is controlled in dependence on one or more temperature measurements. In the depicted embodiment, the interconnection is provided with a plurality of temperature gauges 7 mounted on the second face 3b of the substrate 3. The temperature gauges 7 are positioned in proximity to the interfaces 4 and therefore provide temperature readings, which are indicative of the temperature of the interfaces 4 and thus the temperature of the cells (since the cells are thermally coupled to the interfaces 4 via thermally conductive connection tabs 5). In particular, the temperature gauges 7 may be arranged such that measurements made by the temperature gauges provide an indication of any temperature differences between cells connected to different interfaces 4. In the depicted embodiment, the temperature gauges 7 are arranged linearly at different positions on the x-axis shown in the Figures. However other arrangements of the temperature gauges 7 may be envisaged.

The temperature gauges 7 may be connected to a controller arranged to control the flow of current through the resistors 6. For example, the temperature gauges 7 may be communicatively coupled to one or more of the connections 8 (e.g. via conductive tracks formed on the substrate 3) to which a controller is connected. The controller may receive temperature measurements from the temperature gauges 7 and control the flow of current through the resistors 6 in dependence on the received measurements. For example, if measurements from the temperature gauges 7 indicate that different cells are at different temperatures, current may be caused to flow (e.g. by opening a switch) through one or more resistors 6 proximate one or more cells, which temperature measurements indicate as being relatively cool when compared to other cells. The relatively cool cell is therefore heated by the one or more proximate resistors and a temperature difference between different cells is reduced.

As was described above, cells which are situated near to an edge of a battery (e.g. at extreme positions on the x-axis shown in the Figures) may be cooler than cells situated near to a centre of the battery. Measurements taken by the temperature gauges 7 provide an indication of any such temperature gradients in the battery to the controller. The controller may respond by causing current to flow (e.g. by opening one or more switches) through resistors 6 situated in proximity to cells situated near an edge of the battery so as to provide heating to those cells. For example, current may be caused to flow through the outermost resistors 6 shown in the Figures (i.e. the resistors 6 furthest to the left and right in FIG. 2A). By providing heating through resistors situated proximate to relatively cool cells, any temperature gradients in the battery may be reduced.

The temperature gauges 7 may comprise any suitable component capable of measuring temperature. Whilst heat sources in the form of resistors 6 has been described, in some embodiments other forms of heat source may be used in order to provide heating to the interconnection 1. In general, any suitable heat source may be used.

In addition to or as an alternative to providing controlled heating to the interconnection 1, cooling of the interconnection 1 may be controlled in response to temperature measurements, such as those made by the temperature gauges 7. As was described above, the interconnection 1 may be cooled by providing a flow of fluid (e.g. air and/or liquid coolant) in proximity to the heat sink 2. In some embodiments the rate of flow of fluid may be controlled in dependence on measurements taken by the temperature gauges 7. For example, a fan or pump used to generate a cooling fluid flow may be controlled in dependence on the temperature measurements so as to control an amount of cooling provided to the interconnection 1. In the event that the temperature readings taken by the temperature gauges 7 indicate that the temperature of the cells exceed a desired operating temperature of the battery, the flow of cooling fluid may be increased. In the event that the temperature readings taken by the temperature gauges 7 indicate that the temperature of the cells is below a desired operating temperature of the battery, the flow of cooling fluid may be decreased.

It may be desirable for different cells of a battery to charge and/or discharge at approximately the same rate such that the state of charge in each of the cells is substantially the same. However, over time the state of health and performance of different cells in a battery during charge-discharge cycles may begin to deviate through use. Consequently at a given time of a charge/discharge operation different cells may have differing states of charge. It may therefore be desirable to manage the state of charge of cells in a battery, for example, such that any differences in the state of charge between different cells is reduced.

In some embodiments, the interface 1 is provided with electrical circuitry to control the state of charge of cells of the battery. The circuitry may be arranged to provide passive and/or active control of the state of charge of the cells. Passive control of the state of charge of the cells may comprise connecting one or more bypass resistors across one or more cells so as to discharge a cells through a resistor, thereby reducing the state of charge of the cell. For example, the electrical circuitry for controlling the state of charge may comprise voltage gauges for measuring the voltage across each cell. Any cell having a voltage which is greater than the lowest voltage cell may be connected to a bypass resistor in order to reduce the state of charge of that cell so as to bring it into line with the lowest voltage cell. The circuitry may therefore further comprise one or more resistors and switches for connecting the resistors across one or more of the cells. The resistors may be connected across one or more of the cells by electrically connecting (e.g. via conductive tracks on the substrate) the resistors to one or more of the interfaces 4, to which the cells are connected.

Resistors, which form part of electrical circuitry for controlling a state of charge of the cells, may be mounted on the second face 3b of the substrate. As current is drawn through the resistors, heat will be generated in the resistors. As was described above, heat generated on the second face 3b of the substrate 3 (e.g. in the resistors) is conducted through the substrate 3 and to the heat sink 2. The heat sink therefore serves to reduce any undesired localised heating which is caused by circuitry for controlling the state of charge of the cells.

In some embodiments, the resistors used for controlling the state of charge of the cells may be the same as the resistors 6 provided for controlling the temperature of the cells. The same electrical circuitry may therefore be used for both controlling the state of charge of the cells and for controlling the temperature of the cells, thereby reducing the required number of components. In other embodiments, electrical circuitry for controlling the state of charge of the cells may be different to electrical circuitry for controlling the temperature of the cells, thereby allowing for independent control of the state of charge and the temperature.

In some embodiments, the circuitry for controlling the state of charge of the cells may additionally or alternatively be configured to provide active control of the state of charge. Active control of the state of charge may comprise transferring charge from one of the cells to another of the cells. For example, charge may be transferred from a cell measured as having a relatively high voltage to a cell measured as having a relatively low voltage so as to balance the state of charge of the cells. Circuitry for providing active control may comprise, for example, one or more DC converters and/or switched capacitors. Such components (not shown) may be mounted on the second face 3b of the substrate 3 and electrically connected to the interfaces 4 (e.g. via conductive tracks on the second face 3b).

In some embodiments, circuitry for controlling the state of charge of the cells may include a controller (e.g. in the form of a micro-processor). The controller (not shown) may be mounted on the substrate 3 or may be situated separately from the substrate 3. The controller may be connected to circuitry situated on the substrate 3 (e.g. in the form of one or more resistors, switches, DC converters, switched capacitors and/or other components) via one or more of the connections 8 provided on the substrate 3.

A controller for controlling the state of charge of the cells may be the same as or may be different to a controller for controlling the temperature of the cells. In some embodiments, a battery management system may be provided for managing one or more properties of the battery such as the state of charge of the cells and/or the temperature of the cells. The battery management system may be coupled to the interconnection 1, for example, by connection to one or more of the connectors 8.

Whilst a specific embodiment of an interconnection 1 is shown in the drawings and is described above, it will be appreciated that other embodiments of the invention are envisaged. For example, an interconnection according to an embodiment of the invention may include components which are arranged differently from the components shown in the Figures without departing from the scope of the invention. Additionally or alternatively an interconnection according to an embodiment of the invention may include more or fewer components than shown in the Figures. For example, in some embodiments an interconnection may include more or fewer interfaces than the five cell-receiving regions 4 shown in the Figures.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An interconnection for a battery comprising a plurality of cells, the interconnection comprising:
    an electrically insulating substrate having a first face and a second face;
    a heat sink on the first face of the substrate;
    a flow of fluid in proximity to the heat sink;
    a layer of electrically conducting material on the second face of the substrate, said layer of electrically conducting material providing a plurality of cell-receiving regions for direct electrical connection with the plurality of cells, wherein the plurality of cell-receiving regions are arranged to allow connection to one or more of the plurality of the cells independently of connection to others of the plurality of cells, and
    electrical circuitry mounted on the second face of the substrate and configured to control a state of charge and a temperature of each of the one or more of the plurality of the cells independently of others of the plurality of cells,
    wherein the electrical circuitry to control the state of charge and the temperature of each of the one of more of the plurality of cells comprises two or more resistors and one or more temperature gauges mounted on the second face of the electrically insulating substrate, and wherein each resistor is positioned at a location proximate to one of the plurality of cell-receiving regions and generates heat when a current is passed through the each resistor, the heat being conducted to the proximate cell-receiving regions, and
    wherein each of the one or more temperature gauges is positioned at a location proximate to one or more of the plurality of cell-receiving regions, and the electrical circuitry controls the current passed through each resistor and the flow of fluid to the heat sink.

2. The interconnection of claim 1, wherein the electrically insulating substrate has a thermal conductivity of at least 0.1 $W.m^{-1}.K^{-1}$.

3. The interconnection of claim 1, wherein the electrically insulating substrate has a thickness of less than 3 mm.

4. The interconnection of claim 1, wherein the layer of electrically conducting material is deposited on the second face of the substrate in discrete cell-receiving regions that are connected to one another by conductive tracks of the electrically conductive material.

5. The interconnection of claim 1, wherein the heat sink comprises a layer of metal disposed on the first face of the substrate.

6. The interconnection of claim 1, wherein the interconnection comprises a metal clad printed circuit board.

7. A battery comprising:
the interconnection according to claim 1; and
the plurality of cells electrically connected to one or more of the plurality of cell-receiving regions of the interconnection.

8. The battery of claim 7, wherein the cells are lithium sulfur cells.

9. The battery of claim 7, wherein the cells comprise contact tabs that are connected to the cell-receiving regions of the interconnection.

10. A method of controlling the temperature of the battery according to claim 7, the method comprising conducting any heat generated in the cells to the cell-receiving regions on the second face of the substrate, and through the substrate to the heat sink, thereby dissipating heat from battery and controlling, by the electrical circuitry comprising the two or more resistors and the one or more temperature gauges mounted on the second face of the substrate, the state of charge of the one or more of the plurality of cells and the temperature of the one or more of the plurality of cells independently to others of the plurality of cells, whereby controlling the temperature of each of the one or more of the plurality of cells comprises:

passing the current through the two or more resistors, and whereby the heat generated in the resistors is used to increase the temperature of the one or more of the cells independently of others of the plurality of cells by conducting the heat generated by the two or more resistors to the proximate cell-receiving regions,
and
increasing the flow of fluid to the heat sink to decrease the temperature of the one or more of the cells through increased cooling of the heat sink.

11. The method of claim 10, whereby the current is passed through the two or more resistors to reduce any temperature differences between the cells.

12. The method of claim 10, which comprises drawing a current from one or more of the cells through the two or more resistors mounted on the second face of the substrate to reduce differences in the state of charge of the cells.

* * * * *